(12) United States Patent
Chang et al.

(10) Patent No.: US 8,288,472 B2
(45) Date of Patent: Oct. 16, 2012

(54) ANTIBIOFOULING NONIONIC-ZWITTERIONIC COPOLYMER

(75) Inventors: Yung Chang, Taoyuan (TW); Wen-Yih Chen, Taoyuan (TW)

(73) Assignee: Chung-Yuan Christian University, Taoyuan (TW)

( * ) Notice: Subject to any disclaimer, the term of this patent is extended or adjusted under 35 U.S.C. 154(b) by 278 days.

(21) Appl. No.: 12/648,761

(22) Filed: Dec. 29, 2009

(65) Prior Publication Data

US 2011/0160392 A1 Jun. 30, 2011

(51) Int. Cl.
*C08L 77/00* (2006.01)
(52) U.S. Cl. ...................... 524/608; 428/336
(58) Field of Classification Search .................. 524/608; 428/336
See application file for complete search history.

(56) References Cited

FOREIGN PATENT DOCUMENTS
WO    WO 2008006677 A1 *  1/2008

OTHER PUBLICATIONS

Chang et al. "Dual-Thermoresponsive Phase Behavior of Blood Compatible Zwitterionic Copolymers Containing Nonionic Poly(N-isopropylacrylamide)", Biomacromolecules, (2009), 10(8), 2092-2100.*
Chang et al., Dual-Thermoresponsive Phase Behavior of Blood Compatible Zwitterionic Copolymers Containing Nonionic Poly(N-isopropyl acrylamide), Jul. 2, 2008, 9 pages, R&D Center for Membrane Technology and Department of Chemical Engineering, Chung Yuan Christian University, Jhong-Li, Taoyuan 320, Taiwan, Department of Chemical and Materials Engineering, National Central University, Jhong-Li, Taoyuan 320, Taiwan, and Research Center for Applied Sciences, Academia Sinica 128 Sec. 2, Academia Road, Nankang, Taipei 11529, Taiwan.
Arotcüare'na et al., Switching the Inside and the Outside of Aggregates of Water-Soluble Block Copolymers with Double Thermoresponsivity, Mar. 16, 2002, 7 pages, Contribution from the De'partement de Chimie, UniVersite' catholique de LouVain, Place L. Pasteur 1, B-1348 LouVain-la-NeuVe, Belgium, and Fraunhofer Institut für Angewandte Polymerforschung, Geiselbergstrasse 69, D-14476 Golm, Bermany.
Arotarna et al., Switching the Inside and the Outside of Aggregates of Water-Soluble Block Copolymers with Double Thermoresponsivity, Feb. 3, 2009, 8 pages, Contribution from the De'partement de Chimie, UniVersite' catholique de LouVain, Place L Pasteur 1, B-1348 LouVain-la-NeuVe, Belgium, and Fraunhofer Institut für Angewandte Polymerforschung, Geiselbergstrasse 69, D-14476 Golm, Bermany.
Cai et al., A Zwitterionic ABC Triblock Copolymer That Forms a "Trinity" of Micellar Aggregates in Aqueous Solution, Aug. 25, 2004, 8 pages, Department of Chemistry, University of Sheffield, Brook Hill, Sheffield, South Yorkshire S3 7HF, UK.

* cited by examiner

*Primary Examiner* — Michael M Bernshteyn
(74) *Attorney, Agent, or Firm* — WPAT PC; Justin King (57) ABSTRACT

The present invention discloses statistical antibiofouling nonionic-zwitterionic copolymers. The antibiofouling nonionic-zwitterionic copolymers are with the LCST (Lower Critical Solution Temperature) and/or UCST (Upper Critical Solution Temperature), and with increasing content of the nonionic monomers, the LCST and/or UCST of copolymers varies.

27 Claims, 10 Drawing Sheets

ANTIBIOFOULING NONIONIC-ZWITTERIONIC COPOLYMER

BACKGROUND OF THE INVENTION

1. Field of the Invention

The present invention is generally related to an antibiofouling copolymer, and more particularly, an antibiofouling statistical nonionic-zwitterionic copolymer.

2. Description of the Prior Art

Zwitterionic polymers containing the pendant groups of phosphobetaine, sulfobetaine, and carboxybetaine have received growing attention for use in the new generation of blood-contacting materials because of their good plasma protein resistance. In the last several years, poly(sulfobetaine methacrylate) (polySBMA) with a methacrylate main chain and an analogue of the taurine betaine pendant group ($CH_2CH_2N^+-(CH_3)_2CH_2CH_2CH_2SO_3$-) has become the most widely studied zwitterionic polymer due to its ease of synthetic preparation.

The thermoresponsive (nonionic) polymer undergoes a sharp hydrophilic-hydrophobic transition in water at a temperature, wherein this temperature is called the lower critical solution temperature (LCST). Poly(N-isopropylacrylamide) (polyNIPAAm) is the most widely studied thermoresponsive polymer. However, the solution properties of zwitterionic polymers differ considerably from those of nonionic polymers. In aqueous solution, polySBMA, like other zwitterionic polymers, exhibits an upper critical solution temperature (UCST) that increases with the molar content.

Recently, some research works reported physical micellization of synthesized diblock copolymers with thermoresponsive and zwitterionic properties. These block copolymers were found to exhibit double thermosensitive phase transition of LCST and UCST behaviors in water. However, these studies did not extend to the use or evaluation of these diblock copolymers as biological or biomedical materials.

In fact, there is potential risk for using the block copolymer in bio-application. The above-mentioned block copolymer combines LCST block (thermoresponsive) and UCST (zwitterionic) block. The inside and outside blocks of the micelles can thus be tuned by a simple thermal stimulus. However, the LCST block (thermoresponsive), such as polyNIPAAm, would cause strong adsorption of protein, cell, or bacterial. When the temperature changes and the outside block of a micelle tuned to be LCST block, strong adsorption of biomolecules may quickly occur on the micelle surface, then may result irreversible aggregates or blocking. It would be especially dangerous to use the block copolymer in blood contacting application.

For the reason that conventional block copolymers with thermoresponsive and zwitterionic properties could probably result in irreversible aggregates or blocking, a need has arisen to propose a novel copolymer suitable for bio-application.

SUMMARY OF THE INVENTION

In view of the foregoing, it is an object of the present embodiment to provide a novel copolymer and hydrogel with good thermoresponsive and antibiofouling property.

According to one embodiment, an antibiofouling statistical nonionic-zwitterionic copolymer is polymerized by a nonionic monomer and a zwitterionic monomer.

According to another embodiment, an antibiofouling statistical nonionic-zwitterionic hydrogel is polymerized by a nonionic monomer, a zwitterionic monomer, and a crosslinker.

The present invention further discloses the copolymers are with the LCST (Lower Critical Solution Temperature) and/or UCST (Upper Critical Solution Temperature). The copolymers and hydrogels could be used as antibiofouling coating materials, coatings for control of cell adhesion/detachment, coatings for the inhibition of cell growth, or base materials in a polymer-drug conjugate.

DESCRIPTION OF THE PREFERRED EMBODIMENTS

What is probed into the invention is an antibiofouling nonionic-zwitterionic copolymer. Detail descriptions of the structure and elements will be provided in the following in order to make the invention thoroughly understood. Obviously, the application of the invention is not confined to specific details familiar to those who are skilled in the art. On the other hand, the common structures and elements that are known to everyone are not described in details to avoid unnecessary limits of the invention. Some preferred embodiments of the present invention will now be described in greater detail in the following specification. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

The first embodiment of the present invention discloses an antibiofouling nonionic-zwitterionic copolymer, wherein the antibiofouling nonionic-zwitterionic copolymer is a statistical copolymer polymerized by a nonionic monomer and a zwitterionic monomer. The copolymer is prepared by conventional free radical polymerization or atom transfer radical polymerization (ATRP).

The above-mentioned nonionic monomer comprises one of the group consisting of: N-alkylacrylamide, N,N-dialkylacrylamide, diacetone acrylamide, N-acryloylpyrrolidine, vinyl acetate, styrene, N-vinylimidazoline, hydroxy alkyl celluloses, polyoxazolidones, polyvinyl methyl ethers, polyethlyene oxide, polymethacrylic acid, dimethylaminoethyl methacrylate (DMAEMA), and their derivatives.

The above-mentioned zwitterionic monomer comprises zwitterionic functional groups, the zwitterionic functional groups comprise one of the group consisting of: phosphobetaine, sufobetaine, carboxylbetaine, and their derivatives.

An example of this embodiment is shown that the zwitterionic functional groups could comprise mix-charged monomers (negatively charged monomer and positively charged monomer), the mix-charged monomers comprise mixing two oppositely charged compounds with overall charge neutrality. Some positively charged monomers are exemplified in Table 1:

TABLE 1

| 2-(dimethylamino)ethyl methacrylate |  |
|---|---|
| 2-(diethylamino)ethyl methacrylate |  |

TABLE 1-continued

| [2-(methacryloyloxy)ethyl] trimethylammonium chloride |  |

Some negatively charged monomers are exemplified in Table 2:

TABLE 2

| 2-carboxyethyl acrylate |  |
|---|---|
| 3-sulfopropyl methacrylate potassium salt |  |
| ethylene glycol methacrylate phosphate |  |

Another example of this embodiment is shown that the nonionic monomer and the zwitterionic monomer are both acrylic monomer.

Exemplary Embodiment I

Preparation of poly(SBMA-co-NIPAAm) in Aqueous Solution

A total solid content of 8 wt % for different mass ratios of SBMA and NIPAAm (Table 3) was dissolved in 10.2 mL of DI water, and nitrogen was bubbled to remove residual oxygen. The copolymerization of poly(SBMA-co-NIPAAm) was initiated using 8.0 mg of APS and 8.0 mg (0.011 mL) of TEMED. The relative molar ratio of [APS]:[TEMED] was 1:2. The reaction was stirred under positive nitrogen pressure for 6 hr at 23° C. After polymerization, the resulting reaction solution was cooled to 4° C. for 3 hr and then added slowly into acetone and re-dissolved into DI water repeatedly to precipitate the polymer out of the reaction solution and to remove residue chemicals. Then, the copolymer was dried in a vacuum oven at room temperature (23° C.) to yield a white powder.

TABLE 3

Characteristic Data of poly(SBMA-co-NIPAAm) statistical copolymers

| Sample ID | Reaction ratios of comonomers (wt %)$^a$ | | Compositions of copolymers (mol %)$^b$ | | Critical solution temperature (° C.)$^c$ | |
|---|---|---|---|---|---|---|
| | SBMA | NIPAAm | polySBMA | polyNIPAAm | UCST | LCST |
| S100-N0 | 100 | 0 | 100.0 | 0.0 | 27 | — |
| S70-N30 | 70 | 30 | 45.3 | 54.7 | 18 | — |
| S50-N50 | 50 | 50 | 29.0 | 71.0 | 15 | 41 |

TABLE 3-continued

Characteristic Data of poly(SBMA-co-NIPAAm) statistical copolymers

| Sample ID | Reaction ratios of comonomers (wt %)[a] | | Compositions of copolymers (mol %)[b] | | Critical solution temperature (° C.)[c] | |
|---|---|---|---|---|---|---|
| | SBMA | NIPAAm | polySBMA | polyNIPAAm | UCST | LCST |
| S30-N70 | 30 | 70 | 15.0 | 85.0 | — | 37 |
| S0-N100 | 0 | 100 | 0.0 | 100.0 | — | 32 |

[a]Reaction mass ratios of SBMA and NIPAAm monomers used with fixed total monomer mass amount of 0.8 g in the prepared reaction solution.
[b]The composition of the poly(SBMA-co-NIPAAm) copolymers was estimated by 1H NMR in D$_2$O from the relative peak area of (CH$_3$)$_2$N$^+$ proton resonance of the polySBMA side groups at δ = 3.2 ppm and that of the methyl proton resonance of the polyNIPAAm isopropyl groups at δ = 1.14 ppm.
[c]UCST and LCST were determined by reading the absorbance at 230 nm on a UV-Visible spectrophotometer.

Figure 2:
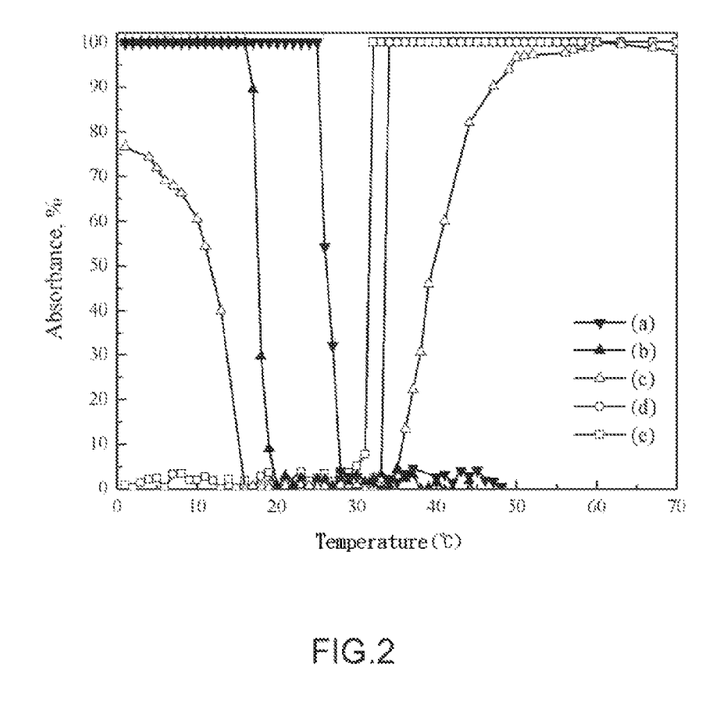
FIG. 2 shows absorbance of copolymer solutions as a function of temperature for the various samples of (a) S100-N0, (b) S70-N30, (c) S50-N50, (d) S30-N70, and (e) S0-N100 at the polymer concentration of 5 wt % according to the first embodiment of the present invention.
Figure 3:
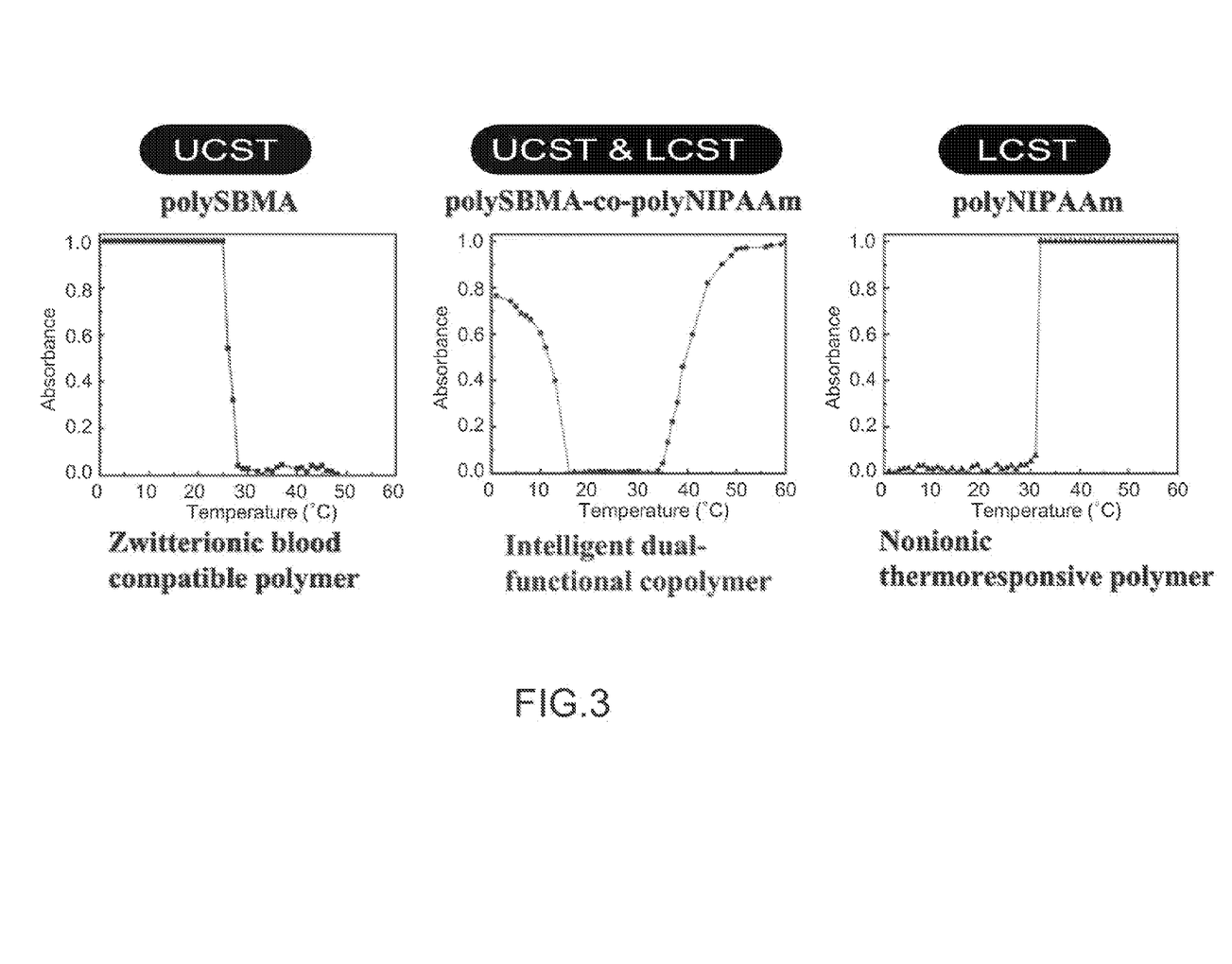
FIG. 3 shows the UCST of polySBMA, the UCST and the LCST of the S50-N50, and the LCST of polyNIPAAm.

Referring to FIG. 2, polySBMA is only with UCST [curve (a) in FIG. 2], polyNIPAAm is only with LCST [curve (e) in FIG. 2], polySBMA-co-polyNIPPAm with about 1:1 reaction ratio (wt %) of nonionic monomers and zwitterionic monomers are with both the UCST and LCST [curve (c) in FIG. 2]. With increasing content of the nonionic monomer, the critical solution temperature curve of the copolymer varies.

Comparing curve (a) with curve (b) in FIG. 2, when the reaction ratio (wt %) of nonionic monomers and zwitterionic monomers is more than 0 and less than 1, with increasing content of the nonionic monomer, the UCST (Upper Critical Solution Temperature) varies.

Comparing curve (d) with curve (e) in FIG. 2, when the reaction ratio (wt %) of nonionic monomers and zwitterionic monomers is more than 1, with increasing content of the nonionic monomers, the LCST (Lower Critical Solution Temperature) varies.

Detailed data is discussed in a disclosure entitled "Dual-Thermoresponsive Phase Behavior of Blood Compatible Zwitterionic Copolymers Containing Nonionic Poly(N-isopropyl acrylamide)," Biomacromolecules 2009, 10, 2092-2100, by Yung Chang et al., the disclosure of which is hereby incorporated by reference.

Figure 1A:
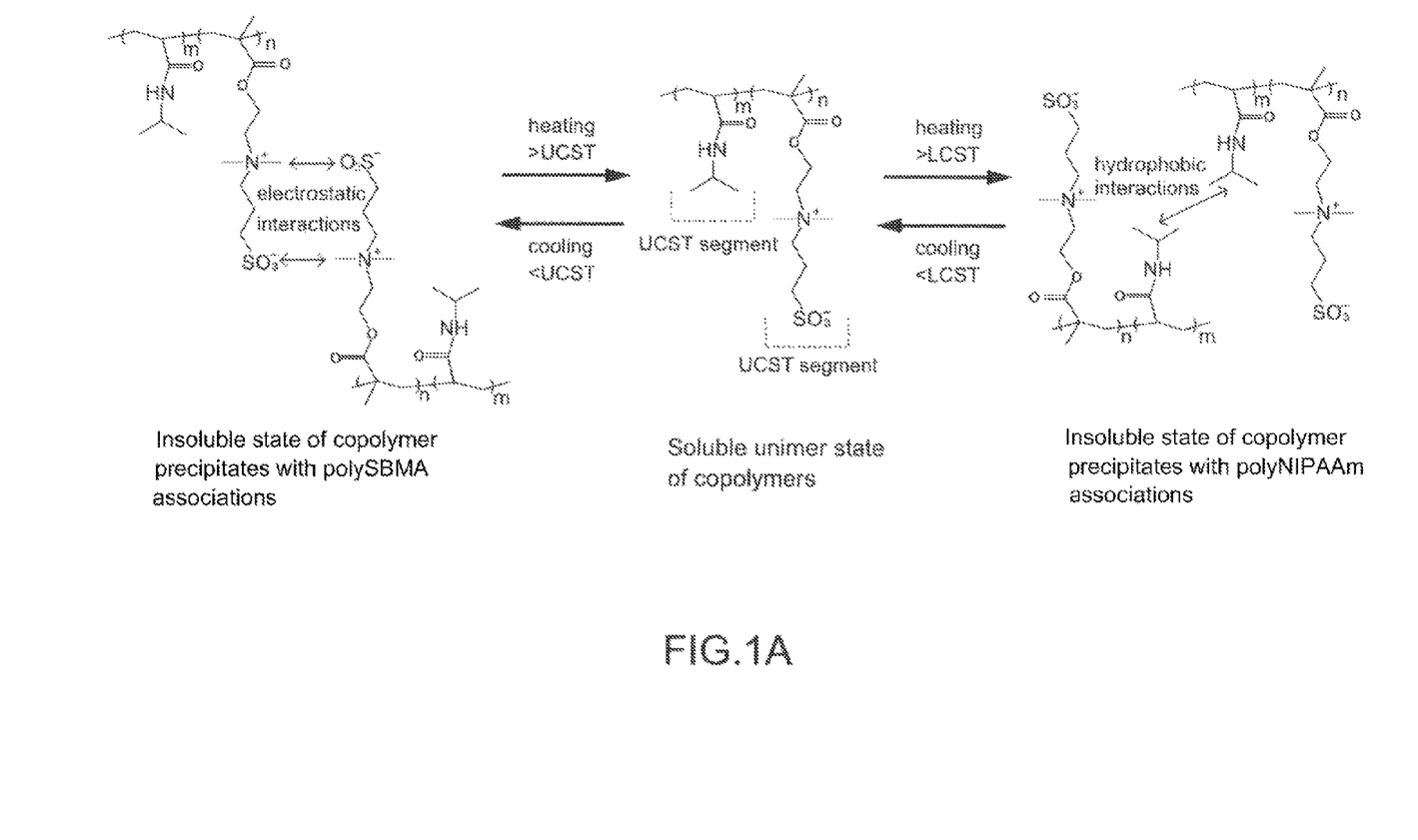
FIG. 1A, 1B is a simplified model of the temperature dependence of the copolymer solubility and insolubility in aqueous solution for the case of copolymer S50-N50.
Figure 1B:
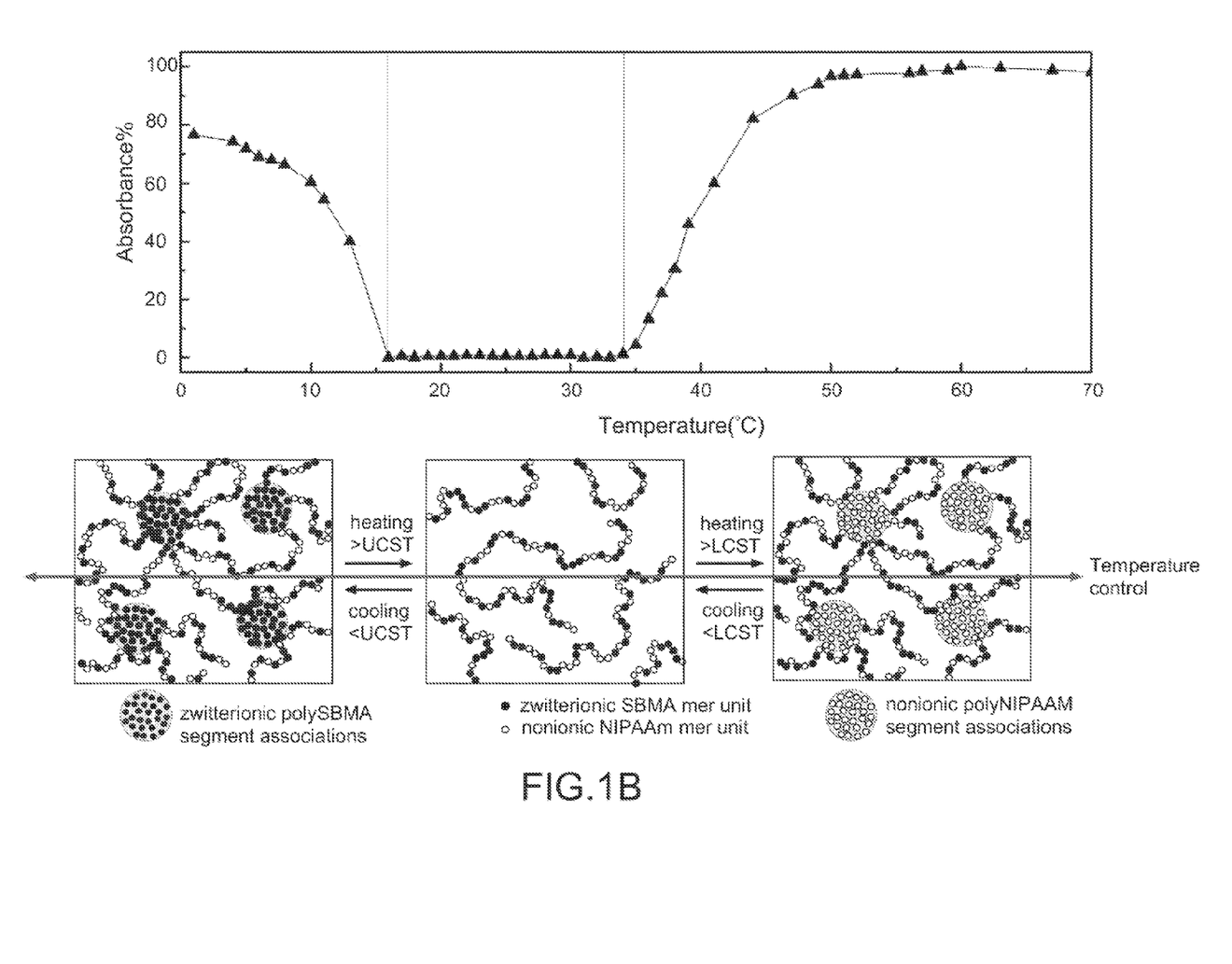

Referring to FIG. 1A and FIG. 1B, the curve (c) [copolymer S50-N50] in aqueous solution is soluble from 15° C. to 41° C. but insoluble below 15° C. and above 41° C. at a copolymer concentration of 5 wt %. In the intermediate temperature range (15° C. to 41° C.), that is, above the UCST and below the LCST, copolymers were observed to exist as soluble unimers in water, but beyond this range, copolymers were considered to precipitate as collapsed associations in water. It is suggested that this doubly thermoresponsive solubility behavior of the prepared copolymer results from the formation of inter and intramolecular electrostatic interactions by SBMA segments of zwitterionic sulfobetaine groups and intramolecular hydrophobic interactions by NIPAAm segments of nonionic isopropyl groups.

Figure 4:
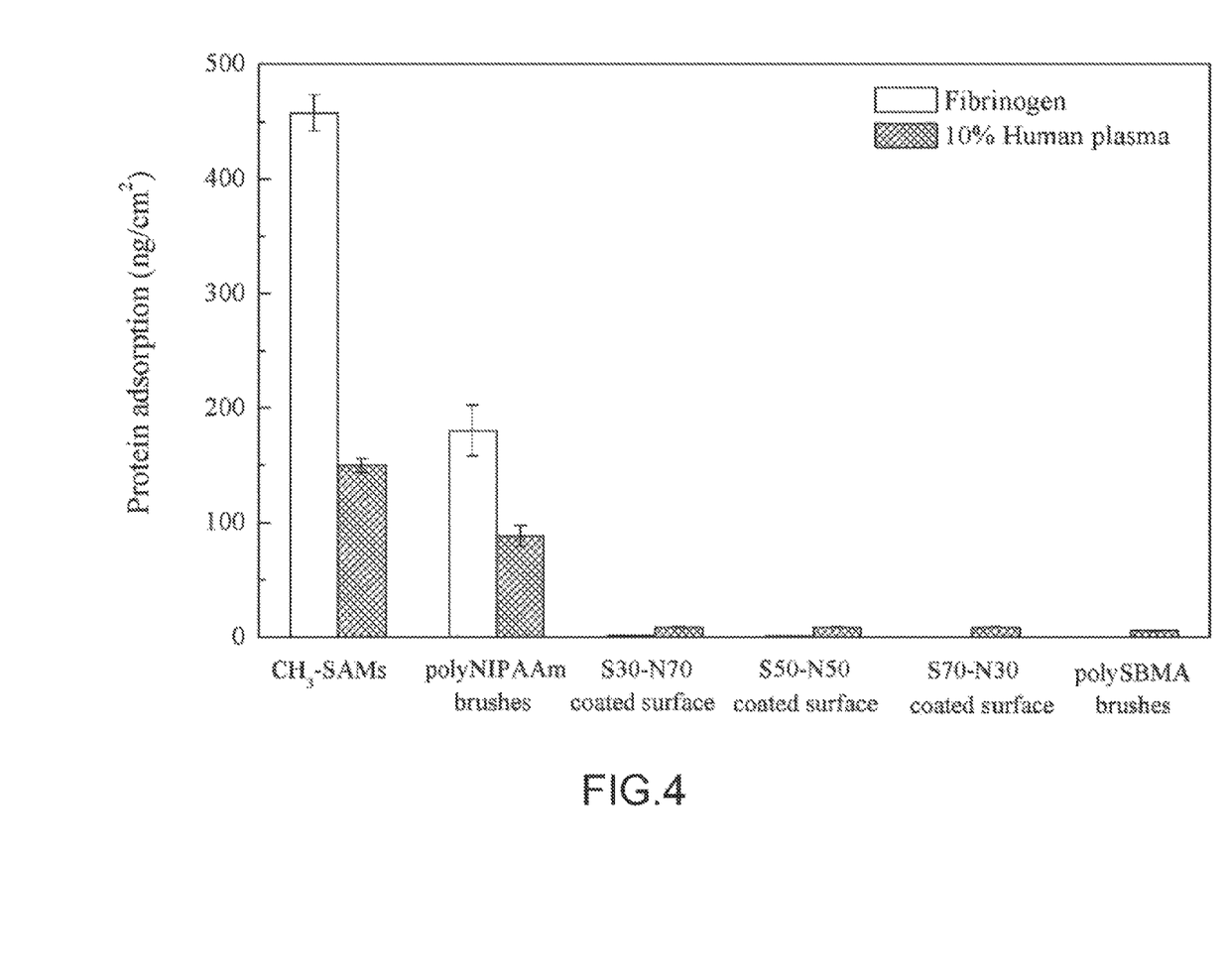
FIG. 4 shows adsorption of 1 mg/mL fibrinogen and 10% human plasma in PBS buffer on $CH_3$-SAMs, surfaces grafted with polyNIPAAm brushes and polySBMA brushes, and surfaces coated with S30-N70, S50-N50 and S70-N50 at 37° C. according to the first embodiment of the present invention.

The copolymer is a blood compatible material with protein, cell and bacterial non-adhesive property. FIG. 4 shows that S30-N70 coated surface, S50-N50 coated surface, S70-N30 coated surface and polySBMA brushes are highly resistant to nonspecific adsorption for human fibrinogen and human plasma proteins at 37° C., while hydrophobic CH$_3$-SAMs and polyNIPAAm brushes show high protein adsorption.

Detailed data of adsorption for human fibrinogen and human plasma proteins is discussed in the above-mentioned disclosure entitled "Dual-Thermoresponsive Phase Behavior of Blood Compatible Zwitterionic Copolymers Containing Nonionic Poly(N-isopropyl acrylamide)," Biomacromolecules 2009, 10, 2092-2100, by Yung Chang et al., the disclosure of which is hereby incorporated by reference. Some experiments about the copolymer property of the embodiments illustrated above are discussed in the same disclosure.

The copolymer could be used as an antibiofouling coating material. In addition, the copolymer could be a coating for control of cell adhesion/detachment, used in rapid detachment of cultured cells from substrate. The copolymer could be a coating for the inhibition of cell growth, preservation.

Moreover, the copolymer could be used as a base material in a polymer-drug conjugate with UCST (Upper Critical Solution Temperature). The conjugate is gel type with a plurality of zwitterionic segment association and drug embedded in the zwitterionic segment association at the temperature below the UCST. When the temperature is above the UCST, the zwitterionic segment association is destroyed and the drug is then released.

Furthermore, the copolymer could be used as a base material in a polymer-drug conjugate with LCST (Lower Critical Solution Temperature), the conjugate is gel type with a plurality of nonionic segment association and drug embedded in the nonionic monomers segment at the temperature above the LCST. When the temperature is below the LCST, the nonionic segment association is destroyed and the drug is then released.

The Second embodiment of the present invention discloses an antibiofouling nonionic-zwitterionic hydrogel, wherein the antibiofouling nonionic-zwitterionic hydrogel is a statistical copolymer polymerized by a nonionic monomer, a zwitterionic monomer, and a cross-linker. The copolymer is prepared by conventional free radical polymerization or atom transfer radical polymerization (ATRP).

The above mentioned nonionic monomer and zwitterionic monomer are described in the first embodiment.

Furthermore, the above mentioned nonionic monomer, the zwitterionic monomer, and the cross-linker could all be acrylic monomer.

The above mentioned cross-linker could contain at least two alkene groups.

Exemplary Embodiment II

Preparation of Poly(NIPAAm-co-SBMA) hydrogels in Aqueous Solution

Figure 5:
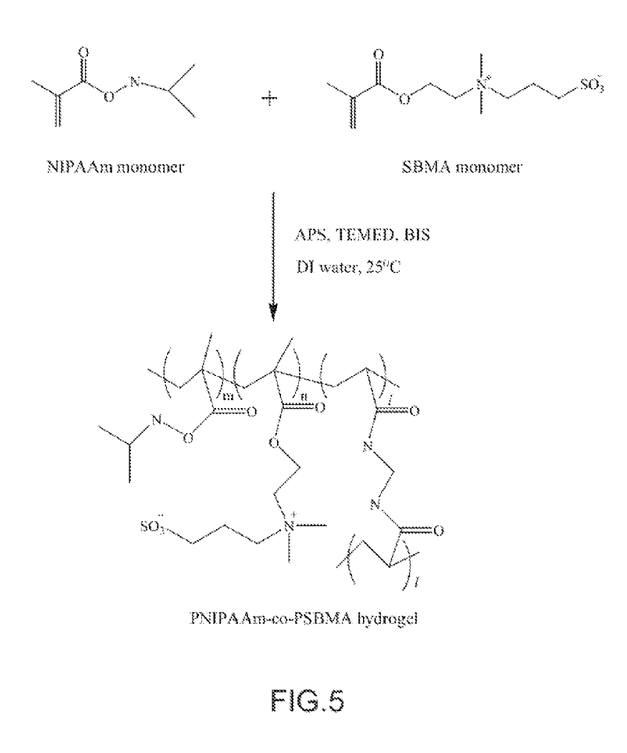
FIG. 5 shows reaction scheme of the hydrogel according to the second embodiment of the present invention.

Poly(NIPAAm-co-SBMA) hydrogels were synthesized by chemical free radical reaction of NIPAAm and SBMA, here we varying the weight percent of SBMA from 20, 50, 70 and 100% (Table 4). Firstly, NIPAAm monomer, SBMA monomer, and small amount of crosslinker (BIS) were dissolved by DI water, and then continued with addition of initiator. (Reaction scheme is shown in FIG. 5) Here the initiator will initiate the free radical reaction by breaking down the double bonds of C carbon and the end site of NIPAAm, SBMA and BIS molecular structure. After free radical formed (it can be on the end site BIS, NIPAAm or SBMA) the free radical polymerization reaction is started. The addition of NIPAAm monomer to the active chain of SBMA monomer or BIS and soon after all of the chemical component totally reacted.

TABLE 4

The reaction conditions for the copolymerization of the hydrogels

| Hydrogel | Compositions for reaction solution (wt %) | | | | | | Weight degree of swelling (w/w) |
|---|---|---|---|---|---|---|---|
| | NIPAAm | SBMA | BIS | APS | TEMED | DI water | |
| S#0 | 20 | 0 | 1.6 | 0.2 | 0.2 | 78 | 3.8 |
| S#20 | 16 | 4 | 1.6 | 0.2 | 0.2 | 78 | 3.2 |
| S#50 | 10 | 10 | 1.6 | 0.2 | 0.2 | 78 | 3.0 |
| S#70 | 4 | 16 | 1.6 | 0.2 | 0.2 | 78 | 2.7 |
| S#100 | 0 | 20 | 1.6 | 0.2 | 0.2 | 78 | 2.1 |

Figure 6:
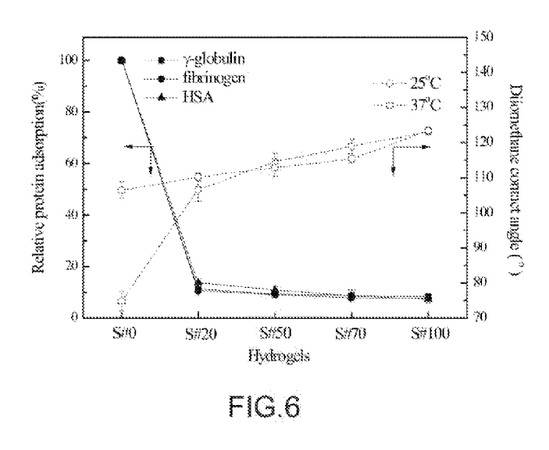
FIG. 6 shows the relative human protein adsorptions on the surface of hydrogels versus diidomethane contact angle at temperature 37° C.

FIG. 6 shows the relative human protein adsorptions on the surface of hydrogels versus diidomethane contact angle at temperature 37° C. From this figure, it obviously shows that adsorption of human protein (HSA, fibrinogen and gamma globulin) on hydrogels surfaces were dramatically decreased at hydrogels containing SBMA 20 wt %. This result can be correlated with diidomethane contact angle on the hydrogel surface. In this experiment diidomethane contact angle were observed at temperature 37° C. and temperature 25° as references.

Figure 7:
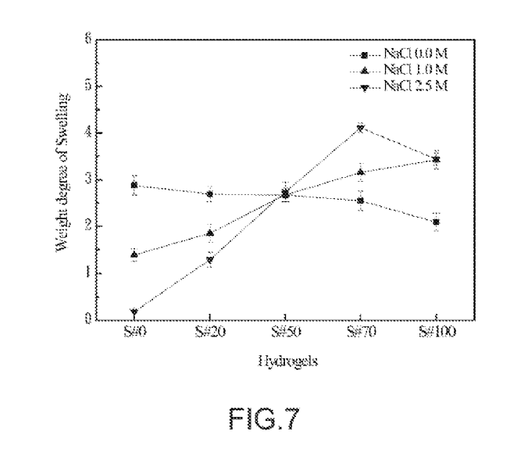
FIG. 7 shows the weight degree of swelling of the hydrogels at different salt concentration according to the second embodiment of the present invention.

FIG. 7 shows the weight degree of swelling of the hydrogels at different salt concentration according to this embodiment. At a constant salt concentration equal to or more than 0.1 M in aqueous solution, the weight degree of swelling of the provided hydrogel is more than that of a hydrogel made with only nonionic monomer and cross-linker. Furthermore, when the weight ratio of the nonionic monomers and the zwitterionic monomers ranges from 0 to 1, the weight degree of swelling of the nonionic-zwitterionic hydrogel increases with increasing salt concentration, measured at a salt concentration equal to or more than 0.1 M in aqueous solution.

Figure 8:
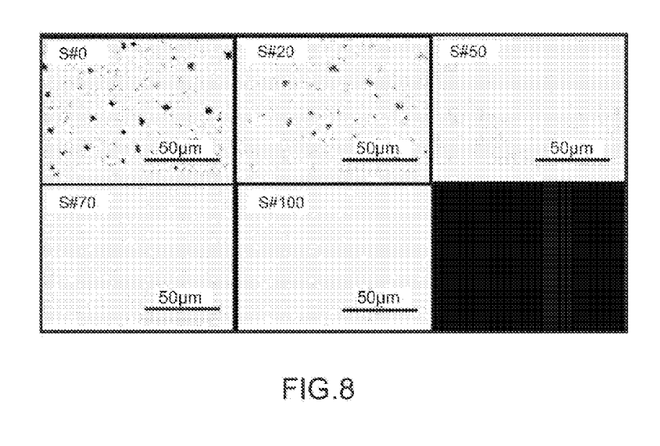
FIG. 8 SEM photographs of human blood platelets adhered onto the surfaces of polyNIPAAm gel (S#0), poly(NIPAAm-co-SBMA) gels (S#20, S#50, and S#70), and polySBMA gel (S#100) according to the second embodiment of the present invention.

FIG. 8 shows SEM images, at a magnification of 1,000×, of the prepared substrates in contact with platelet-rich plasma solution prepared form human whole blood for 120 min at 37° C. in vitro. The SEM results showed that the platelet adherance was remarkably suppressed on co-polymeric hydrogel surfaces compared to that on surfaces of polyNIPAAm gels. It is clearly observed that the platelets have spread on polyNIPAAm gels at 37° C., which indicates the activation of the platelet. However, there is still a small amount of slightly activated platelets on gel surfaces of S#20. The excellent performance of gel surfaces containing polySBMA above 31 mol % in no obvious adhesion of blood platelet is due to its ability to highly resist nonspecific protein adsorption from blood plasma. It was shown that no platelets adhered to the gel surfaces of S#50 and S#70 as compared with S#20 gels.

Figure 9:
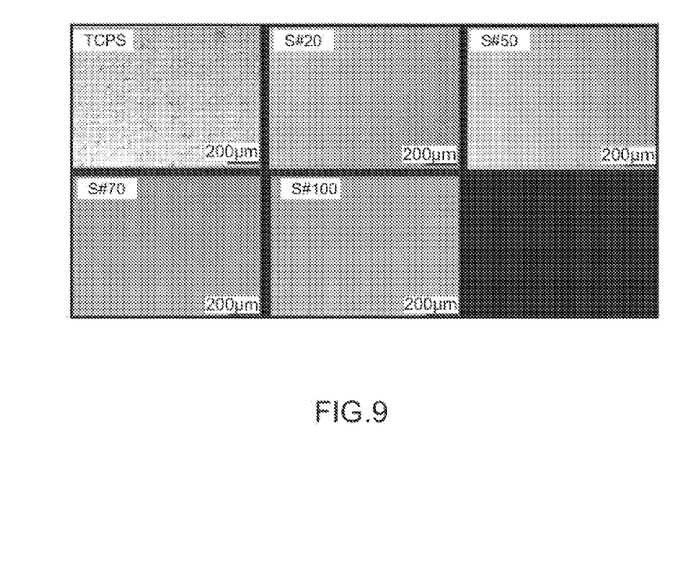
FIG. 9 Cell culture of H68 adhering onto the surfaces of TCPS, poly(NIPAAm-co-SBMA) gels (S#20, S#50, and S#70), and polySBMA gel (S#100) for 3 days according to the second embodiment of the present invention.

Human fibroblasts (HS 68) were cultured on the hydrogel surfaces in a 24-well tissue culture polystyrene (TCPS) plate at 37° C. for 3 days, and the samples were then observed under a microscope equipped with a digital camera (NIKON CCD) using a 10× objective. The images at a magnification of 100× are shown in FIG. 9. HS 68 cell adhesion and growth on the gel surfaces was observed compared with a flat TCPS surface. For the bare TCPS plate, HS 68 cells adhered and spread over the TCPS surface into a confluent-like layer.

Figure 10:
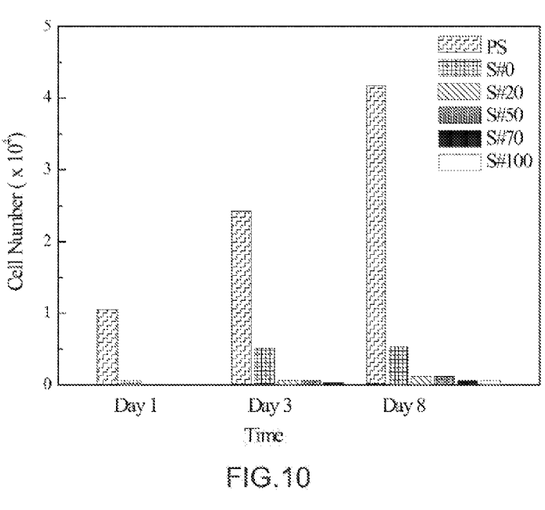
FIG. 10 Cell growth of H68 adhering onto the surfaces of TCPS, polyNIPAAm gel (S#0), poly(NIPAAm-co-SBMA) gels (S#20, S#50, and S#70), and polySBMA gel (S#100) for 1, 3, and 8 days according to the second embodiment of the present invention. Cell culture was performed at an initial concentration of $10^4$ cells/mL.

FIG. 10 shows changes in the cell number of lived HS 68 cells grown on the TCPS plate and five gel surfaces at 37° C. in a long-term culturing from 1 to 8 days, which were determined by MTT test. Cell growth on the poly(NIPAAm-co-SBMA) gel surfaces (S#20, S#50, and S#70) was suppressed compared with that on TCPS plate and polyNIPAAm gel surfaces. No cell growth can be observed on the co-polymeric gels as SBMA molar ratio above 31 mol %, even the culture time for up to 8 days. Cell detachment was also observed in the samples of S#0 and S#20 as the temperature decreased to 25° C., which is attributed to hydration of polyNIPAAm segments with water molecules to form a hydrophilic gel surfaces supported in FIG. 6. Interestingly, it was also found that the incorporation of zwitterionic SBMA units into the polyNIPAAm gels, such as S#20, accelerated the hydration of the cell-cultured surfaces and resulted in more rapid cell detachment during the temperature transition from 37° C. to 25° C. However, it should be noted that the introduction of highly increased zwitterionic components in the poly (NIPAAm-co-SBMA) hydrogels has resulted in a dramatic decrease in cell adhesion and growth at 37° C. Because of this unique property, thermo-responsive polyNIPAAm hydrogels incorporating zwitterionic polySBMA can be used to control the attachment or detachment of cells on the surfaces.

Figure 11:
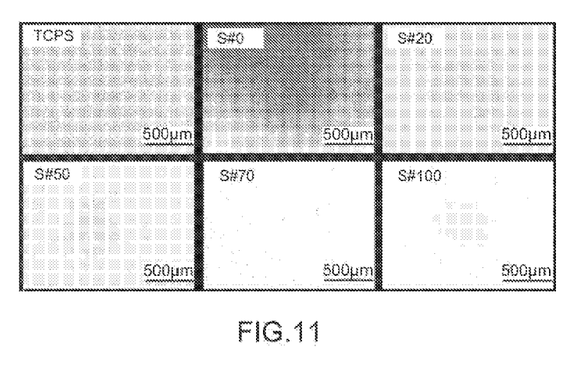
FIG. 11 Fluorescence microscopic images of *S. epidermidis* attachment on the surfaces of TCPS, poly(NIPAAm-co-SBMA) gels (S#20, S#50, and S#70), and polySBMA gel (S#100) at 24 h according to the second embodiment of the present invention.
Figure 12:
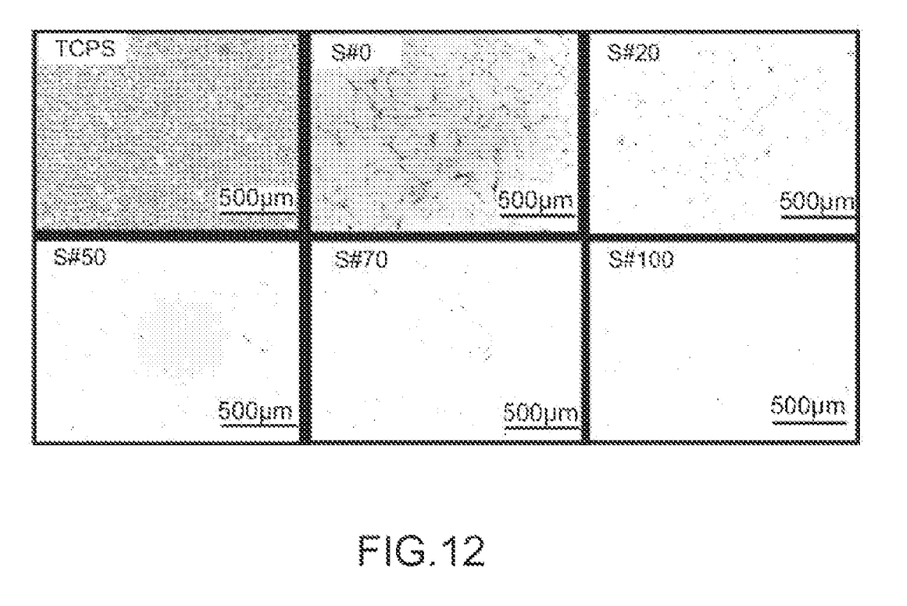
FIG. 12 Fluorescence microscopic images of *E. coli* attachment on the surfaces of TCPS, poly(NIPAAm-co-SBMA) gels (S#20, S#50, and S#70), and polySBMA gel (S#100) at 24 h according to the second embodiment of the present invention.

Two bacterial species, Gram-positive *S. epidermidis* and Gram-negative *E. coli*, were used to investigate the bacterial adhesion behavior on the surface of poly(NIPAAm-co-SBMA) hydrogels. The long-term accumulation of the both bacterial on prepared gel surfaces in 24 h period at 37° C. was characterized using Live/Dead BacLight™ assay and then observed by the fluorescent microscope. Hydrophobic surface of 24-well TCPS plate was used as references. The qualitative images of accumulated *S. epidermidis* and *E. coli* on sample surfaces at a magnification of 100× are shown in FIG. 11 and FIG. 12, respectively. The hydrophobic TCPS exhibited the highest biofilm accumulation in the bacterial culture media after 24 h. It might be attributed to the initial stage of nonspecific protein adsorption and subsequent bacterial adhesion onto its hydrophobic surface, especially for the case of the protein contents on the outer cell membrane of *S. epidermidis*. It was found that there appears different morphology of *S. epidermidis* and *E. coli* on polyNIPAAm gel surfaces. *S. epidermidis* tend to form biofilm accumulation with a full-scale bacterial adhesion, while *E. coli* tend to form a network-like structure. Significant qualitatively decreases in adhesion of both Gram-positive and Gram-negative bacteria were observed on poly(NIPAAm-co-SBMA) and polySBMA hydrogels as compared to TCPS and polyNIPAAm gels.

Detailed experiment procedure and data of FIG. 6, FIG. 8 to FIG. 12 are discussed in a disclosure entitled "Stimuli-Responsive and Tunable-Bioadhesive Hydrogels of Nonionic Poly(N-isopropyl acrylamide) Containing Zwitterionic Polysulfobetaine" received by Biomacromolecules, by Yung Chang et al., the disclosure of which is hereby incorporated by reference, when it is published.

The hydrogel is a blood compatible material with protein, cell and bacterial non-adhesive property. The hydrogel could be used for control of cell adhesion/detachment, used in rapid detachment of cultured cells from substrate. The hydrogel could be used for the inhibition of cell growth, preservation.

The hydrogel could be used as a base material in a polymer-drug conjugate with UCST (Upper Critical Solution Temperature), and the conjugate is gel type with a plurality of zwitterionic segment association and drug embedded in the zwitterionic segment association at the temperature below the UCST. When the temperature is above the UCST, the zwitterionic segment association is destroyed and the drug is then released.

Furthermore, the hydrogel could be used as a base material in a polymer-drug conjugate with LCST (Lower Critical Solution Temperature), the conjugate is gel type with a plurality of nonionic segment association and drug embedded in the nonionic monomers segment at the temperature above the LCST. When the temperature is below the LCST, the zwitterionic segment association is destroyed and the drug is then released.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. An antibiofouling nonionic-zwitterionic copolymer, wherein the antibiofouling nonionic-zwitterionic copolymer is a statistical copolymer polymerized by a nonionic monomer and a zwitterionic monomer, wherein the nonionic monomer comprises one of the group consisting of: N-alkylacrylamide, N,N-dialkylacrylamide, diacetone acrylamide, N-acryloylpyrrolidine, vinyl acetate, styrene, N-vinylimidazoline, polymethacrylic acid and dimethylaminoethyl methacrylate(DMAEMA), and wherein the zwitterionic monomer comprises zwitterionic functional groups, the zwitterionic functional groups comprise one of the group consisting of: phosphobetaine, sufobetaine and carboxylbetaine.

2. The copolymer according to claim 1, wherein the zwitterionic functional groups comprises mix-charged monomers, the mix-charged monomers comprise mixing two oppositely charged compounds with overall charge neutrality.

3. The copolymer according to claim 1, with increasing content of the nonionic monomer, the critical solution temperature curve of the copolymer varies.

4. The copolymer according to claim 1, wherein the nonionic monomer and the zwitterionic monomer are both acrylic monomer.

5. The copolymer according to claim 1, wherein the copolymer is prepared by Free Radical Polymerization or Atom Transfer Radical Polymerization (ATRP).

6. The copolymer according to claim 1, when the reaction ratio (wt %) of nonionic monomers and zwitterionic monomers is more than 0 and less than 1, with increasing content of the nonionic monomer, the UCST (Upper Critical Solution Temperature) varies.

7. The copolymer according to claim 1, when the reaction ratio (wt %) of nonionic monomers and zwitterionic monomers is about 1, the copolymer is with the LCST (Lower Critical Solution Temperature) and UCST (Upper Critical Solution Temperature).

8. The copolymer according to claim 1, when the reaction ratio (wt %) of nonionic monomers and zwitterionic monomers is more than 1, with increasing content of the nonionic monomers, the LCST (Lower Critical Solution Temperature) varies.

9. The copolymer according to claim 1, wherein the copolymer is a blood compatible material with protein, cell and bacterial non-adhesive property.

10. The copolymer according to claim 1, wherein the copolymer is an antibiofouling coating material.

11. The copolymer according to claim 1, wherein the copolymer is a coating for control of cell adhesion/detachment, used in rapid detachment of cultured cells from substrate.

12. The copolymer according to claim 1, wherein the copolymer is a coating for the inhibition of cell growth, preservation.

13. The copolymer according to claim 1, wherein the copolymer is used as a base material in a polymer-drug conjugate with UCST (Upper Critical Solution Temperature), the conjugate is gel type with a plurality of zwitterionic segment association and drug embedded in the zwitterionic segment association at the temperature below the UCST.

14. The copolymer according to claim 1, wherein the copolymer is used as a base material in a polymer-drug conjugate with LCST (Lower Critical Solution Temperature), the conjugate is gel type with a plurality of nonionic segment association and drug embedded in the nonionic monomers segment at the temperature above the LCST.

15. An antibiofouling nonionic-zwitterionic hydrogel, wherein the antibiofouling nonionic-zwitterionic hydrogel is a statistical copolymer polymerized by a nonionic monomer, a zwitterionic monomer, and a cross-linker, wherein the nonionic monomer comprises one of the group consisting of: N-alkylacrylamide, N,N-dialkylacrylamide, diacetone acrylamide, N-acryloylpyrrolidine, vinyl acetate, styrene, N-vinylimidazoline, polymethacrylic acid and dimethylaminoethyl methacrylate(DMAEMA), and wherein the zwitterionic monomer comprises zwitterionic functional groups, the zwitterionic functional groups comprise one of the group consisting of: phosphobetaine, sufobetaine and carboxylbetaine.

16. The hydrogel according to claim 15, wherein the zwitterionic functional groups comprises mix-charged monomers, the mix-charged monomers comprise mixing two oppositely charged compounds with overall charge neutrality.

17. The hydrogel according to claim 15, wherein the nonionic monomer, the zwitterionic monomer, and the cross-linker are all acrylic monomer.

18. The hydrogel according to claim 15, wherein the cross-linker contains at least two alkene groups.

19. The hydrogel according to claim 15, wherein the weight ratio of zwitterionic monomers and the nonionic monomers is equal to or more than 0.25, and the relative protein adsorption of the nonionic-zwitterionic hydrogel is equal to or less than 20%.

20. The hydrogel according to claim 15, the weight degree of swelling of the hydrogel is more than that of a hydrogel made with only nonionic monomer and cross-linker, measured at a constant salt concentration equal to or more than 0.1 M in aqueous solution.

21. The hydrogel according to claim 15, wherein the weight ratio of the nonionic monomers and the zwitterionic monomers ranges from 0 to 1, the weight degree of swelling of the nonionic-zwitterionic hydrogel increases with increasing salt concentration, measured at a salt concentration equal to or more than 0.1 M in aqueous solution.

22. The hydrogel according to claim 15, wherein the antibiofouling nonionic-zwitterionic hydrogel is prepared by Free Radical Polymerization or Atom Transfer Radical Polymerization (ATRP).

23. The hydrogel according to claim 15, wherein the hydrogel is a blood compatible material with protein and bacterial non-adhesive property.

24. The hydrogel according to claim 15, wherein the hydrogel is used for control of cell adhesion/detachment, used in rapid detachment of cultured cells from substrate.

25. The hydrogel according to claim 15, wherein the hydrogel is used for the inhibition of cell growth, preservation.

26. The hydrogel according to claim 15, wherein the hydrogel is used as a base material in a polymer-drug conjugate with UCST (Upper Critical Solution Temperature), the conjugate is gel type with a plurality of zwitterionic segment association and drug embedded in the zwitterionic segment association at the temperature below the UCST.

27. The hydrogel according to claim 15, wherein the hydrogel is used as a base material in a polymer-drug conjugate with LCST (Lower Critical Solution Temperature), the conjugate is gel type with a plurality of nonionic segment association and drug embedded in the nonionic monomers segment at the temperature above the LCST.

* * * * *